April 12, 1927.

M. D. BEACH

MEANS FOR BRAKING MOTOR VEHICLES

Filed Oct. 26, 1923

Inventor;
Milo D. Beach
By

Patented Apr. 12, 1927.

1,624,574

UNITED STATES PATENT OFFICE.

MILO D. BEACH, OF LITCHFIELD, CONNECTICUT.

MEANS FOR BRAKING MOTOR VEHICLES.

Application filed October 26, 1923. Serial No. 670,819.

This invention relates to the braking of a motor vehicle by engine action.

Various means have been proposed heretofore for utilizing the compression of an internal combustion engine for the purpose of controlling the speed of the motor vehicle carrying the engine but, so far as I am aware, earlier inventions have only partially accomplished the desired object.

The object of my invention is to provide efficient and powerful braking means, utilizing the compression action of the pistons to the end that even the steepest grades may be descended by the motor vehicle at speeds wholly under the control of the driver, without requiring the use of the ordinary brakes but without interfering with the use of such brakes if their use is desired.

A practical embodiment of my invention utilizes the intake manifold as a compression chamber, supplemented by the cylinders of the engine, with means for preventing the back pressure from entering the carbureter, combined with a controllable let-off or relief valve by which the compression may be controlled at will so that the engine will operate at such speed as will afford the rate of travel desired by the driver.

Combined with the foregoing means is means, adapted to be put into use at the will of the driver, by which each intake and each exhaust valve for a given cylinder of the engine will be opened at each revolution of the engine crank shaft instead of at every other revolution thereof. That is to say, said means will open each valve twice for a given revolution of the cam or valve shaft, instead of only once during the complete revolution of said cam or valve shaft, it being understood that when the engine is running as usual in propelling the car, the cam or valve shaft ordinarily opens a given valve only once for two complete revolutions of the engine crank shaft.

The foregoing manner of valve operation is accomplished at the will of the driver by providing the usual cam or valve shaft with two additional cams for each valve and so located in reference to the usual valve opening cam on said shaft that by longitudinally shifting the cam or valve shaft, the cams which operate the valve rockers or valve operating devices will be displaced from normal position and the other cams arranged to operate the valves, thus effecting opening of any valve once during each revolution of the crank shaft or twice during each revolution of the cam shaft.

Thus, the driver may instantly shift the cam or valve shaft so that the braking crms are rendered operative and the exhaust valves are thus opened on the down stroke of each piston to allow an inrush of air, whereas the intake valves are open on the up-stroke of each piston so that the air previously drawn in on the down stroke, is compressed and forced into the intake manifold and into other cylinders, thus affording a body of compressed air which is open to the pistons on their up-stroke to resist the up-stroke and afford a powerful braking action.

The relief valve enables the driver to control the relief of the air pressure to any desired extent and he thus has control of the speed of the vehicle so that descent of the car down a grade, or its progress on a level surface, will not be too slow should the engine be used as a braking medium.

In carrying out my invention, the manifold may be made larger than usual, if desired, to increase its cubical capacity for the compressed air.

While the present invention is illustrated in connection with a poppet valve type of engine such as in common use, I wish it understood that it is not restricted to the poppet valve type of engine as it may be used in connection with engines of any type by resorting to certain modifications.

The valve provided for preventing the compressed air from being forced into the carbureter is so arranged that said valve automatically opens when the engine is operated as a power plant in driving the car.

Figure 1:
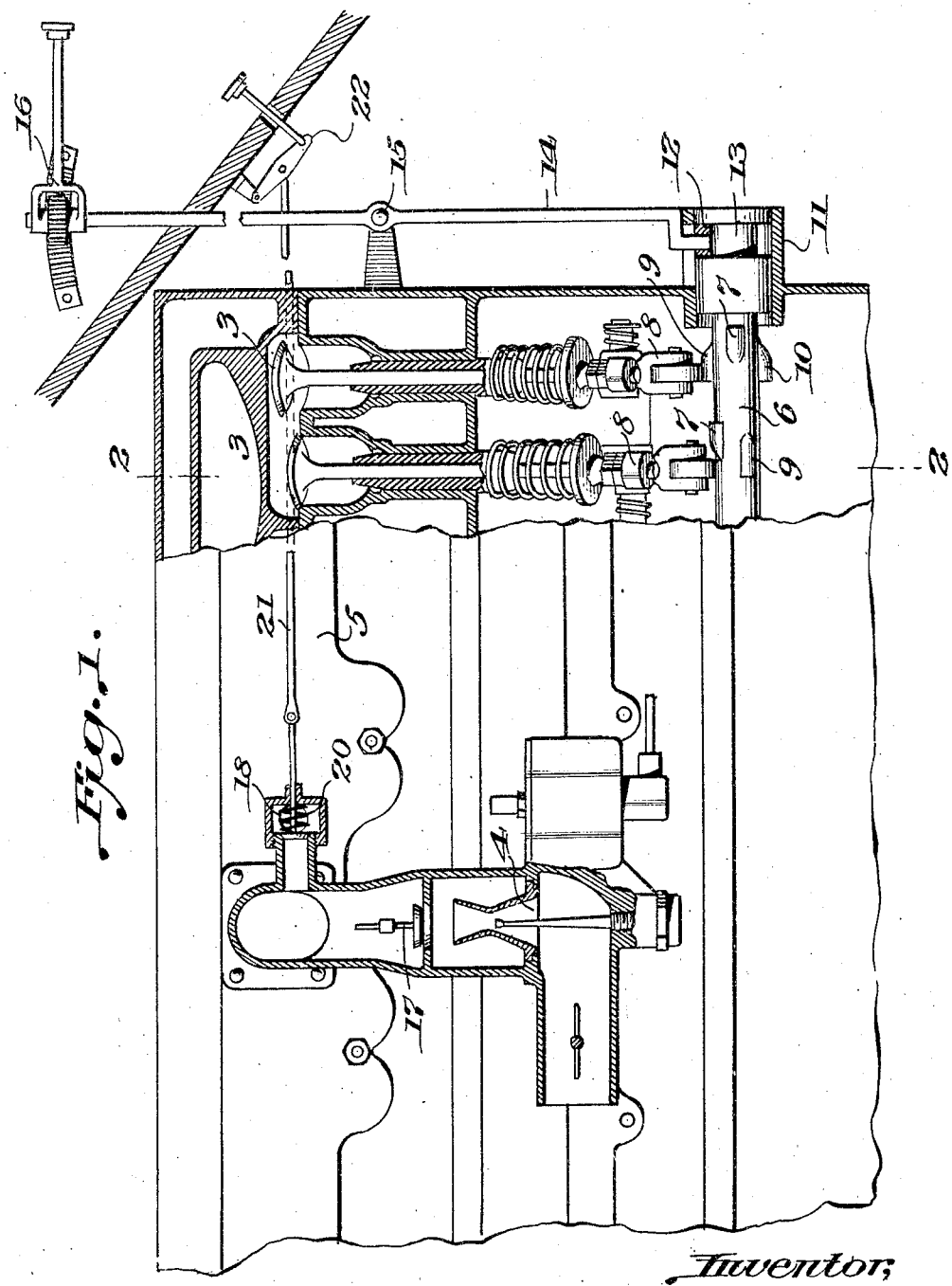
Figure 1 is a side elevation, broken away and in section, illustrating the application of the invention to an internal combustion engine such as is used on a motor vehicle.
Figure 2:
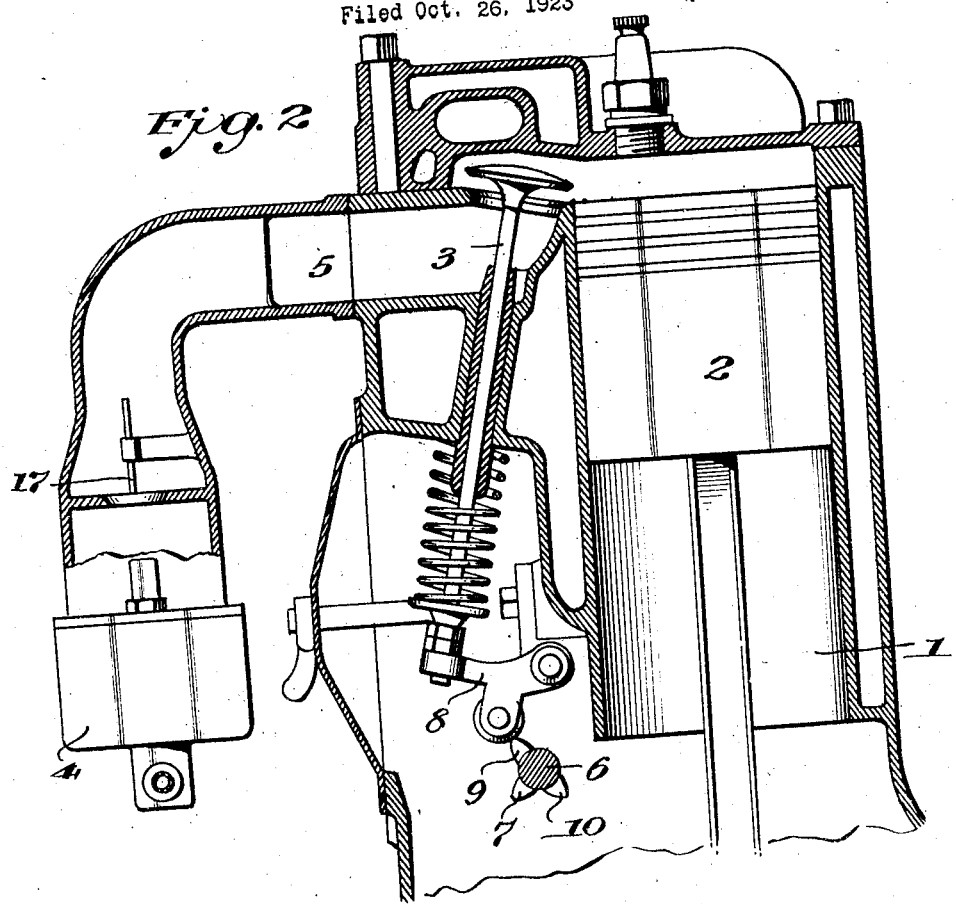
Fig. 2 is a vertical section on line 2—2, Fig. 1.

The practical embodiment of the invention disclosed in the drawings is in connection with a well known type of automobile internal combustion engine. It is to be understood, however, that the invention may be used in connection with any internal combustion engine employed for driving a motor vehicle and that, by suitable modification, the invention may be applied to internal combustion engines of any type.

Certain of the cylinders are designated at 1 and the pistons are shown at 2. The valves for intake and exhaust appear at 3.

The carbureter is shown at 4, the intake manifold appears at 5, and valve or cam shaft for operating the valves is shown at 6.

Valve or cam shafts usually make one revolution for each two revolutions of the engine crank shaft, the usual cam 7 being provided on the shaft 6 to cooperate with the valve rocker 8 to open each valve 3 once during one revolution of the cam shaft 6 or two revolutions of the engine crank shaft.

For the purpose of carrying out the present invention, the cam shaft 6 is provided with a pair of diametrically opposite cams 9, 10, arranged in offset or staggered relation to the cams 7, considered in the direction of the length of the shaft 6 so that, normally, these cams 9, 10, are out of alinement with the respective rockers 8, whereas the usual cams 7 are in alinement with said rockers.

It will be understood that in addition to the single cam 7 for operating the rocker 8, in each instance, as when the engine is running as a power plant, there will be provided a pair of additional cams 9, 10, for each rocker 8, the cams 9, 10, being normally out of operative position.

To render the cams 9, 10, effective, and the cams 7 ineffective, so that the engine will act as an automatic brake on the vehicle when the latter is descending a grade or is to be slowed down, the shaft 6 is mounted so that it may be slid longitudinally in its bearings, one of which is shown at 11, Fig. 1.

Any suitable means may be provided for shifting the cam shaft 6, one such means being shown in Fig. 1 and comprising a yoke 12 received in a groove 13 in shaft 6, a shifter lever 14 pivoted at 15, and suitable operating means 16 located in convenient position to be operated by the driver.

When the shaft 6 is in normal position the cams 7 are so located that they will operate the valve rockers 8 in the ordinary manner so that the engine and valves will then operate as usual for driving the car. When the shaft 6 is shifted to displace the cam 7 from normal position, the braking cams 9, 10, are brought into line with the rockers 8 and, thereupon, the valves 3 are opened once for every revolution of the engine crank shaft to thereby effect the braking action hereafter described.

To prevent the compression caused by the breaking operation from forcing air back into the carbureter 4, there is provided a valve 17 which permits the charge to be sucked into the engine from the carbureter but prevents the air from being forced back, said valve closing when the engine is used as a braking means.

To enable the driver to control the braking operation by letting off the compression as may be desired, a relief valve 18 is provided. This valve is normally held seated by a spring 20 of sufficient strength to resist opening during operation of the engine. A link 21 and suitable manually operated means 22, arranged conveniently for the driver, enable the driver to press upon the valve 18 to any desired extent to control relief of the pressure in the manifold 5 during a braking operation.

If desired, the valve 17 may be provided with a spring.

Figure 3:
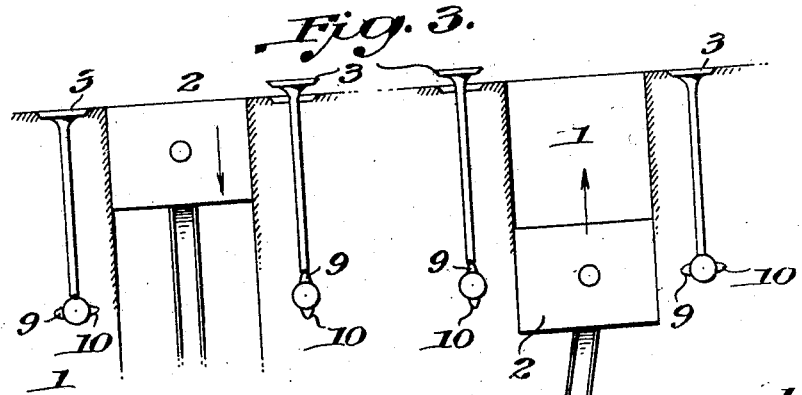
Fig. 3 is a diagrammatic view showing the operation of the intake and exhaust valves in connection with two cylinders.

As illustrated in Fig. 3, which shows diagrammatically two pistons and cylinders and an intake and exhaust valve for each cylinder, the braking cams 9, 10, are so arranged that the exhaust valves are open on the down stroke of the pistons and the intake valves are open on the up strike. Consequently, when the pistons descend air is drawn in through the exhaust valves and when the pistons rise, the exhaust valves then close and the intake valves open so that the air previously drawn in is compressed by the rising pistons and forced into the manifold 5 and into other cylinders of the engine. This results in the pistons operating against compressed air which quickly builds up such a resistance that the engine effectually brakes the car. To prevent this operation from becoming too abrupt and to enable the car to be slowed down to a suitable speed and yet allowed to move as fast as the driver may deem advisable, the air pressure may be let off by the opening and closing relief valve 18 under the control of the operator. The relief valve 18 is held closed by its spring and when the engine is used as a brake, the driver uses his foot to increase the pressure on the valve, thus holding the valve closed against relief of the pressure to any extent desired. If the foot pressure is released, the valve will open when the air pressure in the intake manifold becomes greater than the tension of the spring.

While the invention is illustrated and described, as employing the intake manifold as a compression chamber, I am aware that the exhaust manifold instead of the intake manifold, may be used as such compression chamber. I do not, therefore, limit the invention to the use of the intake manifold as the compression chamber.

While the invention is shown and described in connection with a poppet valve type of internal combustion engine, it can, by certain modification within its spirit and scope, be embodied in any type of internal combustion engine.

The broad principle of the invention resides in the provision of means, in connection with an internal combustion engine, whereby the engine may be arranged so that it will force air into a chamber and to readmit the compressed air to the engine cylinder to resist the instroke of the piston; further, to provide means for controlling the air pressure in the chamber so that the resistance to piston movement may be regulated.

In the claims the word "in-stroke" means the movement or stroke of the piston toward the cylinder head; the word "out-stroke" means the movement of the piston away from the cylinder head.

I claim:

1. Means for braking motor vehicles by the use of the internal combustion engine thereof comprising devices for opening the exhaust valves on every out-stroke of the engine pistons and closing said valves on every in-stroke of the pistons and for closing the intake valves on every out-stroke of the pistons and opening said intake valves on every in-stroke of the pistons, whereby air is repeatedly drawn into the engine on every out-stroke of the pistons and is compressed into the engine manifold on every in-stroke of the pistons, whereby operation of the pistons cumulatively builds up an air pressure in the manifold and cylinders, and an automatically-acting valve which normally permits the carburetted charge to pass to the manifold, said valve being adapted to close to prevent the escape of the cumulatively built up compressed air from the manifold into the carbureter.

2. Means for braking motor vehicles by the use of the internal combustion engine thereof comprising devices for opening the exhaust valves on every out-stroke of the engine pistons and closing said valves on every in-stroke of the pistons and for closing the intake valves on every out-stroke of the pistons and opening said intake valves on every in-stroke of the pistons, whereby air is repeatedly drawn into the engine on every out-stroke of the pistons and is compressed into the engine manifold on every in-stroke of the pistons, whereby operation of the pistons cumulatively builds up an air pressure in the manifold and cylinders, means for preventing the escape of the compressed air from the manifold into the carbureter, and means, controllable at will, for regulating the pressure thus cumulatively built up, to thereby control the resistance offered to the pistons on their in-strokes.

3. Means for braking motor vehicles by the use of the internal combustion engine thereof, comprising a shiftable cam or valve shaft which is provided with the usual valve-opening cams and, also, with additional, or braking, cams, means for shifting said cam shaft to render the usual cams, or the braking cams, effective, said braking cams being adapted, when arranged for cooperation with the intake and exhaust valves of the engine, to so operate said valves that the exhaust valves will be opened on every out-stroke of the pistons and closed on every in-stroke, and the intake valves will be closed on every out-stroke of the pistons and opened on every in-stroke thereof, whereby the operation of the pistons cumulatively builds up an air pressure in the manifold and cylinders, means for preventing the escape of the compressed air from the manifold into the carbureter, and a relief valve, controllable at the will of the driver for letting off the cumulatively built up air pressure so that the braking and action of the engine may be controlled.

4. An internal combustion engine having intake and exhaust valves, operating means for said valves, controllable at will, adapted to be set to cause the valves to operate in the usual manner, or, for reversing the action of said valves so that the engine will be converted into an air compressor whereby the pistons will cumulatively build up a resisting air pressure in the engine manifold to check every in-stroke of the pistons, and automatically-acting means which acts to prevent escape of the cumulatively built up air pressure from the manifold into the carbureter when the engine is acting as an air compressor.

5. An internal combustion engine having intake and exhaust valves, operating means for said valves, controllable at will, adapted to be set to cause the valves to operate in the usual manner, or, for reversing the action of said valves so that the engine will be converted into an air compressor whereby the pistons will cumulatively build up a resisting air pressure in the engine manifold to check every in-stroke of the pistons, automatically-acting means which acts to prevent escape of the cumulatively built up air pressure from the manifold into the carbureter when the engine is acting as an air compressor, and means for controlling the cumulatively built up air pressure thus provided, whereby the braking action may be regulated.

6. The method of braking a motor vehicle, consisting in utilizing the compression of the propelling engine thereof to cumulatively build up an air pressure in a closed chamber communicating with the engine cylinder but sealed against communication with the carburetor while using said pressure as a resistance to the operation of the engine pistons, and at will regulating said accumulated resisting pressure to thereby control to any desired extent the braking action which the accumulated pressure while the chamber is sealed from the carburetor, exerts on the engine pistons, 7. A motor vehicle provided with a propelling internal combustion engine having a closed chamber communicating with the engine cylinders into which air may be forced by the operation of the engine, when desired, for the purpose of building up a pressure to resist the operation of the engine, means including a foot-controlled valve for regulating at will to any desired degree the pressure in said chamber and means for preventing the carburetor from communicating with the engine while the pressure is being regulated as aforesaid.

8. The method of braking a motor vehicle, consisting in utilizing the compression of the propelling engine thereof to cumulatively build up an air pressure, using said pressure as a resistance to the operation of the engine pistons, and regulating at will to any desired degree said resisting air pressure while preventing the carbureter from communicating with the engine, to thereby determine the braking action exerted by the engine on the vehicle.

9. Means for braking motor vehicles by means of the internal combustion propelling engine thereof, comprising valve-controlled passages between the cylinders of said engine and an air supply, means adapted to open said valves on every out-stroke of the pistons of said cylinders and to close them on every in-stroke of the pistons, a closed chamber, valve controlled passages between said chamber and said cylinders, and means adapted to open said last-named valves on every in-stroke of the pistons in said cylinders and to close them on every out-stroke of the pistons.

In testimony whereof I affix my signature.

MILO D. BEACH.